United States Patent [19]

Asai et al.

[11] Patent Number: 4,565,278

[45] Date of Patent: Jan. 21, 1986

[54] METHOD OF TRANSFERRING YARN PACKAGES

[75] Inventors: Isao Asai, Toyota; Shigeru Muramatsu, Okazaki; Takayuki Morita; Akira Tanaka, both of Kariya, all of Japan

[73] Assignee: Kabushiki Kaisha Toyoda Jidoshokki Seisakusho, Kariya, Japan

[21] Appl. No.: 492,682

[22] Filed: May 9, 1983

[30] Foreign Application Priority Data

May 12, 1982 [JP] Japan .................. 57-078097

[51] Int. Cl.$^4$ ............................. B65G 47/24
[52] U.S. Cl. ...................... 198/400; 242/35.5 A
[58] Field of Search ............. 198/375, 376, 394, 395, 198/399, 477, 485, 651, 358, 409, 400; 242/35.5 A

[56] References Cited

U.S. PATENT DOCUMENTS

| | | | |
|---|---|---|---|
| 3,500,986 | 3/1970 | Schutt | 198/399 |
| 3,871,511 | 3/1975 | Wentz et al. | 198/358 |
| 3,934,716 | 1/1976 | Heckel | 198/395 |
| 4,119,215 | 10/1978 | Dopp | 198/485 |
| 4,526,267 | 7/1985 | Harding et al. | 198/409 |

FOREIGN PATENT DOCUMENTS

| | | | |
|---|---|---|---|
| 2201013 | 7/1973 | Fed. Rep. of Germany | 198/400 |
| 2430691 | 6/1975 | Fed. Rep. of Germany | 198/395 |
| 31466 | 3/1977 | Japan | 198/651 |
| 54-24587 | 8/1979 | Japan | 198/409 |
| 54-27631 | 9/1979 | Japan | 198/477 |
| 468843 | 7/1975 | U.S.S.R. | 198/409 |

*Primary Examiner*—Joseph E. Valenza
*Attorney, Agent, or Firm*—Brooks Haidt Haffner & Delahunty

[57] ABSTRACT

A method of transferring oppositely but randomly oriented yarn packages from a spinning machine to a subsequent operation comprising moving the spinning machine conveyor on which the yarn packages are so disposed to deposit one of the packages onto a package turning means and stopping the conveyor; sensing the orientation of the package while on the package turning means; turning the package turning means in one direction or the other responsive to signals from the sensing means so that all sequential packages will be removed from the turning means facing in the same direction; moving the package off from the package turning means and sensing whether or not the package has been so removed; and again moving the spinning machine conveyor responsive to the sensing of the first package having been removed from the turning means.

4 Claims, 13 Drawing Figures

METHOD OF TRANSFERRING YARN PACKAGES

BACKGROUND OF THE INVENTION

The present invention relates to a method of transferring yarn packages in a textile machine such as an open-end spinning machine or a winder having a multiplicity of yarn winding units arranged in a row on each longitudinal side of a machine base. More specifically, the present invention relates to a method of transferring yarn packages doffed onto a conveyor disposed centrally on the machine base of such a textile machine, to a following yarn processing step.

Recent years have seen larger-size yarn packages such as cones or cheeses produced from open-end spinning machines or similar textile machines. Since it has become increasingly difficult for workers to manually transfer such yarn packages (hereinafter referred to as a "package"), there have been proposed various efforts for automatically transferring packages to subsequent manufacturing steps. One automatic package transfer proposal is disclosed in Japanese Patent Publication No. 27631, for example. According to this prior art, packages doffed from an open-end spinning machine are stored on a rope conveyor and then placed one by one on a package receiver attached to a chain lifter. As the package on the package receiver is raised, the position of the bobbin hole in the package is detected, whereupon the package receiver is stopped temporarily at a prescribed height. After an empty hanger on a hook coveryor running above the package has been detected, the package receiver is lifted again for a predetermined interval until the bobbin hole in the package is aligned with a peg of the empty hanger in timed relation thereto, whereupon the package is transferred to the hook conveyor. Japanese Patent Publication No. 54-24587 shows a package transfer apparatus having a conveyor disposed in an upper position in an open-end spinning machine for successively transferring packages to an end of a machine base where the package is carried by a peg attached to a lifter which is both movable up and down and rotatable, the peg being inserted in the bobbin hole. Then, the package is raised up to a hook conveyor and simultaneously the package is turned into alignment with the direction of travel of the hook converyor so that the package can be transferred to the hook conveyor. In these prior art arrangements, the packages as transferred are arranged in a row and either oriented in a certain direction or randomly oriented. With textile machines having juxtaposed rows of yarn winding units on both sides of a machine base, righthand and lefthand packages are doffed at random onto a conveyor with some directed rightward while others leftward. It is necessary to transfer cone packages as they are uniformly oriented to a next step so that they will be processed properly. Parallel cheeses, when used in yarn twisting or knitting, are also required to be uniformly oriented for suppressing variations in yarn twists which would be developed in vertical yarn unwinding. However, the conventional package transfer arrangements have had no provision for meeting these requirements.

SUMMARY OF THE INVENTION

Accordingly, it is an object of the present invention to provide a method of transferring packages doffed randomly onto a conveyor in a spinning machine while uniformly orienting them en route.

Another object of the present invention is to provide a method of transferring packages highly efficiently.

Still another object of the present invention is to provide a package transfer method which is of particular advantage in being utilized in an automated process.

With the foregoing prior difficulties in view, there is provided in accordance with the present invention a method of transferring packages in a spinning machine having a first conveyor for transferring the packages as doffed in substantially axially aligned, but randomly oriented relation from a spinning machine to an end of the latter, a second conveyor for transferring the package to a next working step, and package turning means disposed between the first and second conveyors and having a horizontally rotatable package receiver, the method comprising the steps of moving packages one by one from the first conveyor to the package receiver, simultaneously detecting the orientation of the packages one at a time, actuating the package turning means based on the detected orientation for turning the package receiver in a horizontal plane through an angular interval to bring the packages into uniformly oriented condition, and moving the packages one by one from the package turning means to the second conveyor.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
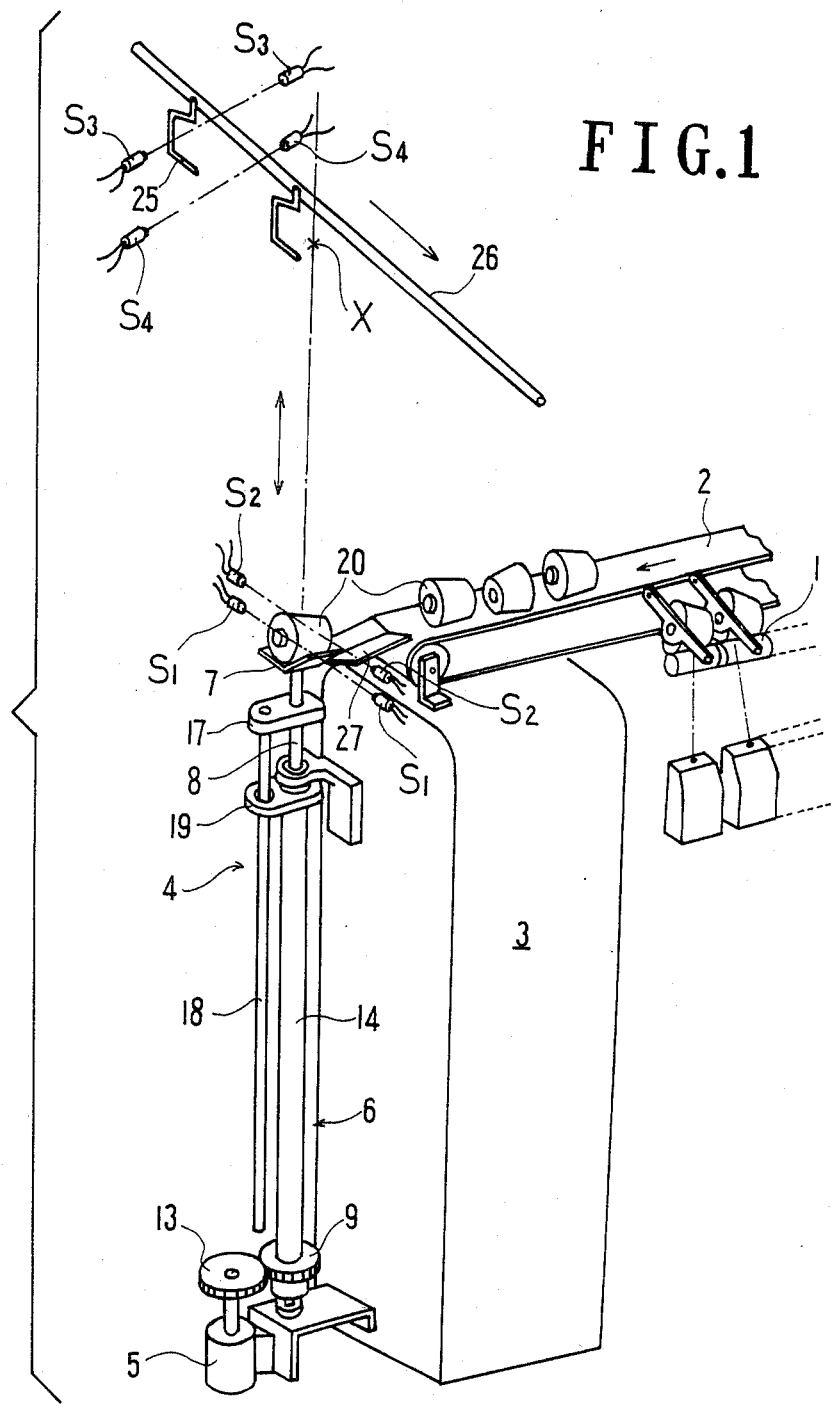
FIG. 1 is a perspective view of an arrangement for carrying out a method according to an embodiment of the present invention.

As shown in FIG. 1, an open-end spinning machine has a multiplicity of yarn winding units 1 arranged in a row on each side of a machine base (only those yarn winding units on one side are shown). A first belt conveyor 2 is disposed in an upper position in the machine base and extends longitudinally toward an end of the machine base. The first belt conveyor 2 is mounted on an end frame 3 which supports a lifter 4 according to the present invention.

Figure 2:
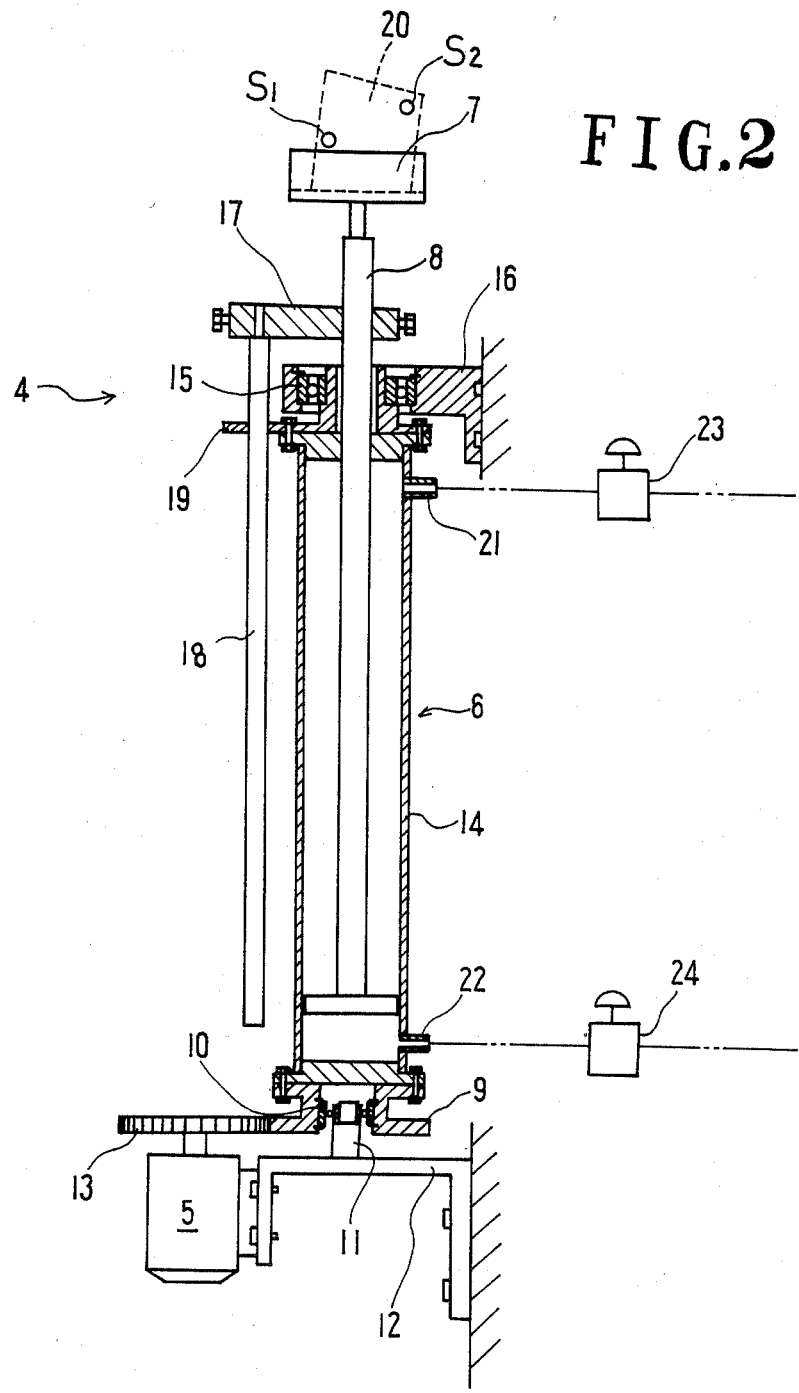
FIG. 2 is a side elevational view, with parts in cross section, of a lifter mechanism.

As illustrated in FIGS. 1 and 2, the lifter 4 generally comprises a stepper motor 5, an air cylinder unit 6, and a package receiver 7. The air cylinder unit 6 has a piston rod 8 directed vertically upward and a gear 9 secured concentrically to a lower end of the air cylinder unit 6. The gear 9 is rotatably mounted by a bearing 10 and a shaft 11 on a bracket 12 fastened to the end frame 3. The stepper motor 5 is attached to the bracket 12 and has a pinion 13 attached coaxially to a motor shaft thereof and held in driving mesh with the gear 9.

The air cylinder unit 6 includes a cylinder 14 having an upper portion rotatably supported by a bearing 15 on a bracket 16 fastened to the end frame 3. A horizontal plate 17 is attached by a screw to an upper end portion of the piston rod 8. A guide rod 18 having a lower distal end directed downwardly is secured at its upper end to the horizontal plate 17 and extends parallel to and along an outer peripheral surface of the cylinder 14. The guide rod 18 is loosely fitted in a hole defined in a flange 19 fixed to an upper cover of the cylinder 14. The package receiver 7 is fixedly mounted on the upper end of the piston rod 8 for placing thereon packages 20, one at a time. The package receiver 7 is preferably in the shape of a trough of triangular cross section with open ends for allowing easy transfer of a package from the first conveyor 2 to a second conveyor (later described). A pair of pipes 21, 22 is connected to the cylinder 14 for introducing air under high pressure into the cylinder 14, the pipes 21, 22 being coupled through valves 23, 24, respectively, to a source of pressurized air.

Operation of the foregoing arrangement will be described: Introduction of pressurized air via the pipe 22 into the cylinder 14 raises the piston rod 8 and hence the package receiver 7. Conversely, the package receiver 7 is lowered when pressurized air is introduced into the cylinder 14 through the pipe 21. As the stepper motor 5 turns through a certain angular interval, the cylinder 14 is turned through a corresponding angular interval about its own axis through the gear 9 and the pinion 13. At the same time, the guide rod 18 extending through the hole in the flange 19 is also angularly moved, and the piston rod 8 is also angularly moved through the intermediary of the horizontal plate 17 through the same angular interval as that of turning movement of the cylinder 14, thus horizontally turning the package receiver 7 exactly through a predetermined angular interval.

Above the lifter 4, there is disposed a hook conveyor 26 extending transversely of the open-end spinning machine and having a multiplicity of hangers 25 dependent therefrom, the hook conveyor 26 serving as a second conveyor, disposed at a skewed angle with respect to the first conveyor 2, for transferring packages to a next manufacturing step. The hook conveyor 26 defines a conveyor path substantially crossing a highest point X of upward movement of the package receiver 7.

Figure 3A:
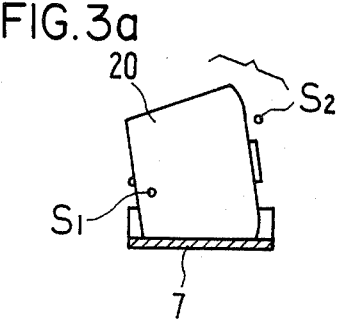
FIGS. 3(a) and 3(b) are views illustrating the principles of determining whether a package is oriented rightward or leftward, the views showing detected end positions.
Figure 3B:
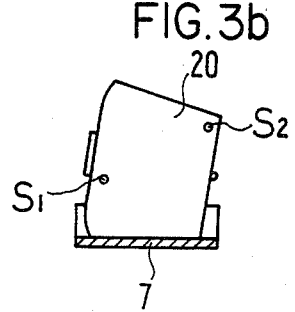

The packages 20 which are conically shaped are doffed randomly onto the first conveyor 2 from both sides of the machine base. The packages 20 have axes directed longitudinally of the machine base, but those doffed from one side of the machine base are oriented in a direction opposite to that in which those from the other side are oriented. The package receiver 7 is held in a standby position slightly lower than the first conveyor 2 and corresponding to the lowest position of downward movement of the piston rod 8. When a photoelectric detector $S_1$ located adjacent to the standby position confirms that there is no package on the package receiver 7 (described later on), the first conveyor 2 starts operating to move the package 20 toward the machine base end. The package 20 is moved from the end of the first conveyor 2 onto a chute 27, from which the package 20 slides down onto the package receiver 7 by gravity. During the sliding movement, the package 20 travels across a detector (not shown) positioned in the vicinity of the chute 27. When the package 20 is detected by this detector, the first conveyor 2 is stopped. Two detectors $S_1$, $S_2$ are disposed side by side in the vicinity of the package receiver 7 for determining whether the package on the package receiver 7 is oriented leftward or rightward. Since the package is in the shape of a truncated cone, its peripheral surface is inclined downwardly toward a smaller-diameter end of the package when the latter lies on the package receiver 7 with the generatrix of the package held against the receiver 7. The detector $S_2$ is positioned such that it can detect any fully wound package on the package receiver 7 when the package has a rightward taper (or a leftward taper), and cannot detect the package when it has a leftward taper (or rightward taper). The detector $S_1$ is positioned such that it can detect any fully wound package irrespectively of the direction in which it is tapered. The combination of signals generated by the detectors $S_1$, $S_2$ thus arranged can determine whether any package is oriented leftward or rightward on the package receiver 7. In examples shown in FIGS. 3(*a*) and 3(*b*), the smaller-diameter package end is directed rightward when both detectors $S_1$, $S_2$ produce signals, and the smaller-diameter package end is oriented leftward when only the detector $S_1$ produces a signal. When there is no package on the package receiver 7, no signal is issued from the detector $S_1$, and when there is any package on the package receiver 7, a signal is generated by the detector $S_1$. Accordingly, such signal absence can be utilized as a signal for starting operation of the first conveyor 2.

The direction as detected in which the package is oriented is temporarily stored in a memory and will be used to energize the stepper motor 5 in determining which direction the package receiver 7 has to be turned through a prescribed angular interval (in the illustrated embodiment, 90° clockwise or counterclockwise).

Figures 4A, 4B, 4C:
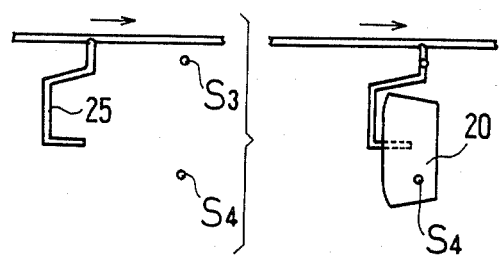
FIGS. 4(a) through 4(c) are views illustrative of the principles of detecting the arrival of a hanger, the views showing detected end positions.
Figure 5A:
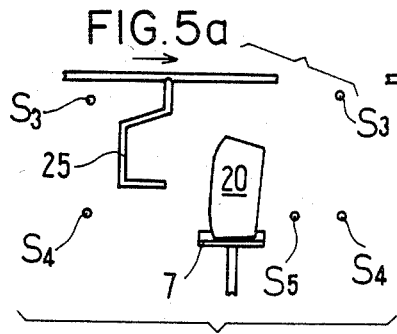
FIGS. 5(a) through 5(c) are views showing the principles of confirming that the package has been transferred to the hanger, the view illustrating detected end positions.
Figures 5B, 5C:
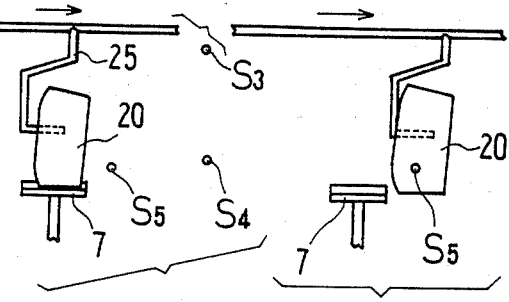

Two pairs of detectors $S_3$, $S_4$ are positioned alongside of the hook conveyor 26 immediately upstream of the position of the package receiver 7. As illustrated in FIGS. 4(*a*) through 4(*c*), the pair of detectors $S_3$ is positioned to detect only the proximal end portion of a hanger 25, while the pair of detectors $S_4$ is positioned to detect a package 20 only. As shown in FIG. 4(*c*), an empty hanger 25 is detected only when the detector pair $S_3$ produces a signal and the detector pair $S_4$ produces no signal. When such a signal combination is produced, the valves 23, 24 are actuated to introduce pressurized air into the cylinder 14 to raise the piston rod 8 with the package receiver thereon. At the same time, a timer (not shown) in a circuit for driving the stepper motor 5 is energized to enable the latter to turn the package receiver 7. While the package receiver 7 moves upwardly to a position out of interference with the chute 27, the stepper motor 5 is fed with a command based on the stored data indicative of the detected package orientation, for thereby turning the package receiver 7 clockwise (as seen from above) through 90°. At the uppermost travel of the package receiver 7, it is positioned ready for arrival of any empty package hanger 25. As the hook conveyor 26 travels, the empty hanger 25 is brought into abutment against the package 20 on the package receiver 7 with a peg of the hanger 25 inserted forward into a central hole in the larger-diameter end of the package 20. Such package pickup motion is illustrated successively in FIGS. 5(a) through 5(c). A detector $S_5$ is located immediately downstream of the package pickup position for detecting only the package on the hanger 25. When the package 20 is completely removed from the package receiver 7, it moves across the detector $S_5$ which then produces a signal to actuate the valves 23, 25, whereupon the cylinder 24 is supplied with pressurized air in a reverse direction to lower the piston rod 8 and hence the package receiver 7. Simultaneouly, another timer in the motor driver circuit is turned on to supply a reverse-rotation command to the stepper motor 5 after the package receiver 7 has moved downwardly out of interference with the hanger 25, thus turning the package receiver 7 counterclockwise (as seen from above) through 90°. At the lowermost end of descending movement, the package receiver 7 returns to the original standby position in which it is held at rest until a next cycle of package transfer operation is started. The upper and lower limits of vertical movement of the piston rod 8 are determined by known means utilizing proximity switches (not shown) disposed at upper and lower end portions of the air cylinder 6.

Figure 6A:
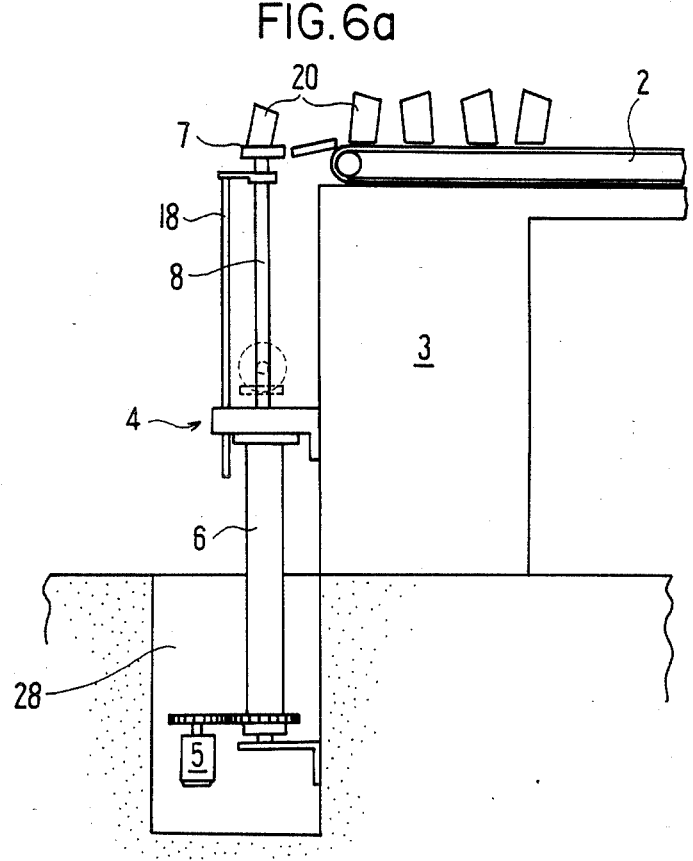
FIGS. 6(a) and 6(b) are front and side elevational views, respectively, showing an arrangement for effecting a method according to another embodiment of the present invention.
Figure 6B:
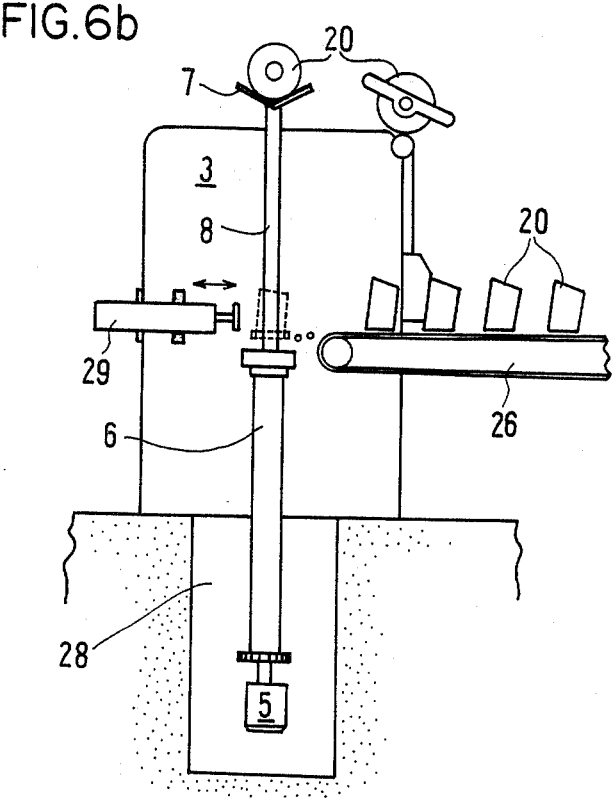

FIGS. 6(a) and 6(b) are illustrative of another arrangement for effecting a method of the present invention. Like or corresponding parts shown in FIGS. 6(a) and 6(b) are denoted by like or corresponding numerals in FIG. 1. A second belt conveyor 26 for moving packages 20 to a next working step is disposed transversely of the machine base with its starting end located at the end frame 3 of the machine base, the second belt conveyor 26 being lower in level than the first belt conveyor 2. The lifter 4 has a lower portion accommodated in a pit 28 defined in a floor. The standby position of the package receiver 7 is defined by the uppermost end of upward movement of the piston rod 8 of the air cylinder 6. The packages 20 are transferred one by one from the first to the second conveyor through vertical movement of the lifter 4. Furthermore, another horizontal air cylinder 29 is mounted on the frame 3 behind the lowermost position of downward movement of the package receiver 7. The horizontal air cylinder 29 is actuatable in timed relation to the second conveyor 26 for pushing the package 20 from the package receiver 7 laterally onto the second conveyor 26. The arrangement of FIGS. 6(a) and 6(b) is more advantageous in that it can eliminate a time interval required for the second conveyor to wait for an empty hanger to arrive during one cycle of operation, and hence the overall operation can be performed without any unwanted time loss. In this embodiment, the movements of the various parts can be detected by detectors positioned in substantially the same locations as those shown in FIG. 1 for controlling such movements.

Figure 7:
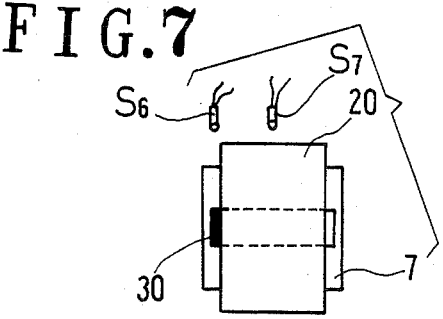
FIG. 7 is a view showing the principles of determining whether a parallel cheese is oriented leftward or rightward, the view being illustrative of a detected end position.

FIG. 7 is illustrative of the manner in which the orientation, leftward or rightward, of a package 20 in the form of a parallel cheese is determined. The bobbin of the parallel cheese to be detected has a righthand end or a lefthand end colored in a certain color, red for example. Detectors $S_6$, $S_7$ are disposed alongside of the lefthand end, for example, of the package 20 as placed on the package receiver 7 and of the central portion of the package 20, respectively. The detector $S_6$ comprises, for example, a color identification sensor capable of detecting a particular color, red in the illustrated embodiment. When signals are generated by both of the detectors $S_6$, $S_7$, the package 20 is oriented leftward on the package receiver 7. When only the detector $S_7$ issues a signal, the package 20 is oriented rightward on the package receiver 7. Based on the signal or signals thus produced, the package receiver 7 remains inactivated or is turned to bring the packages 20 into uniformly oriented condition.

In the foregoing embodiments, the second conveyor may be kept at the same level as that of the first conveyor. With such an alternative, the mechanism for turning the package receiver 7 should be positioned out of interference with the first and second conveyors during operation. Where the first and second conveyors are disposed at different heights, the package turning mechanism may not necessarily be moved upwardly and downwardly. According to such a modification, the package turning mechanism is positioned adjacent to the second conveyor while a package transfer means is interposed between the first conveyor and the package turning mechanism for transferring a package from the terminal end of the first conveyor to the package turning mechanism. The package transfer means may comprise an auxiliary conveyor located adjacent to the terminal end of the first conveyor and a frame swingable by a link mechanism between the auxiliary conveyor and the package turning mechanism.

Although certain preferred embodiments have been shown and described, it should be understood that many changes and modifications may be made therein without departing from the scope of the appended claims.

What is claimed is:
1. A method of transferring sequentially aligned doffed yarn packages from a first movable conveyor mounted on and along the length of a yarn spinning machine onto a second movable conveyor, disposed at a skewed angle with respect to said first conveyor, for conveying the yarn packages away from said spinning machine on, and in the direction of movement of said second conveyor, each said yarn package having first and second ends and including a hollow cylindrical core extending therebetween, and said yarn packages on said first conveyor having their said ends randomly oriented in oppositely facing directions with their said cores aligned in the direction of movement of said first conveyor, comprising the steps of:
  providing a means for identifying at least one of said ends of each of said sequentially aligned yarn packages for distinguishing the respective of said first ends from said second ends of said yarn packages;
  moving said first conveyor to deposit one of said yarn packages onto a package turning means with said core of the package continuing to be so aligned and leaving said core free and clear, and then stopping said first conveyor movement;
  sensing said end-identification means on said yarn package while on said package turning means to detect which of its said ends is facing said first conveyor;
  actuating said package turning means responsive to said sensing to pivot and angularly displace said yarn package thereon towards a selected one of two opposite directions, depending upon which of its said two ends is facing said first conveyor, to face its said first end in one of said opposite directions;

removing said yarn package from said package turning means onto said second conveyor with its said first end facing in said one direction using the movement of said second conveyor to cause a hook thereof to enter and engage said package core;

again sensing said yarn package to detect its presence on said second conveyor;

and again moving said first conveyor responsive to the last said sensing to deposit the next sequential yarn package from said first conveyor onto said package turning means;

and repeating said steps sequentially with respect to each of said sequentially aligned yarn packages, whereby each of said packages is turned in one or the other of said two opposite directions, and all of said first ends of the sequentially transferred packages are oriented in said one direction on said second conveyor.

2. A method according to claim 1, wherein said second conveyor is disposed at a height different from that of said first conveyor, and which further comprises additionally actuating said package turning means responsive to the first said sensing to move said yarn package thereon to a height adjacent to said second conveyor for said moving of the yarn package from said package turning means onto said second conveyor.

3. A method according to claim 1, wherein each said yarn package is produced having cone-shaped wound yarn providing a narrow end and a wider end constituting said first and second ends of the yarn package, and the first said sensing step comprises sensing to confirm the presence of said yarn package on said package turning means, and substantially concurrently sensing to detect whether said package narrow end is adjacent to said first conveyor.

4. A method according to claim 1, wherein said core at one of said first and second ends of each said yarn package is color-coded, and the first said sensing step comprises sensing said color-coded end to detect whether said one end of said yarn package is adjacent to said first conveyor.

* * * * *